United States Patent Office 3,161,086
Patented Dec. 15, 1964

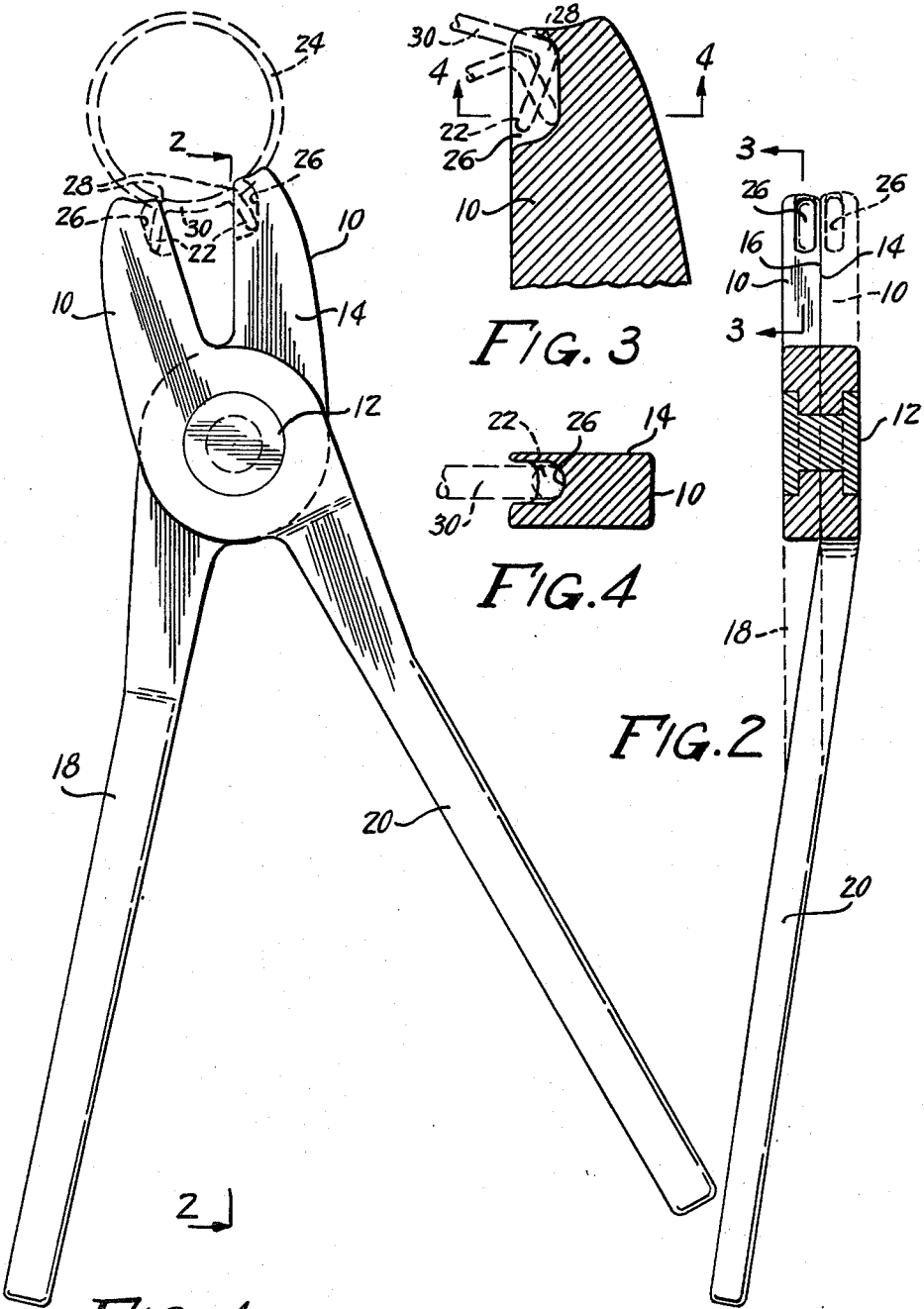

3,161,086
TOOL FOR SPRING WIRE HOSE CLAMPS
Andrew J. Kircher, 4009 Oglethorpe St.,
Hyattsville, Md.
Filed Oct. 17, 1963, Ser. No. 316,964
6 Claims. (Cl. 81—9.3)

This invention relates to improved tools for installation and removal of spring wire hose clamp rings.

The common hose clamp rings are made in several different sizes for the various sizes of hose connections used in fluid systems of all kinds, such as engine water cooling systems, air pressure systems, and many other gas and liquid circuits. The rings are generally made of heavy spring wire, with overlapping side-by-side ends turned outwardly at their extremities to form ears extending radially from the ring and spaced angularly in accordance with the amount of the overlap of the ring ends. This clamp ring is installed or removed by squeezing these ears together to spring the ring outwardly to an increased circumference so that it may be slipped over the hose and moved to the proper clamping position thereon and then released to permit the ring to resiliently tighten itself around the hose, or so that it may be loosened and slipped off the hose connection.

Tools have been used for squeezing these ears together. These tools have usually been in the nature of pliers, and have sometimes been provided with grooves in the opposite plier jaws for these ears on the clamp ring. Difficulties have often been encountered in the use of these tools, due to the tendency of the ring to twist when the ears are squeezed together, making it difficult to hold the ring free from the hose when attempting to move it on or off the hose connection; and also the dangerous tendency of the ears to slip out of the jaws and cause the rings to shoot out with considerable force in unpredictable directions, creating a definite hazard in handling these clamp rings off the hose.

The object of the present invention is to overcome these difficulties by making a safe tool of the plier type with means for guiding the spring ring ends during the squeezing operation so as to prevent the ring from twisting.

A further object is to provide means on the jaws to hold the ring ends against slipping out of the jaws endwise, when the ears are squeezed together.

A further object is to have the jaws move in adjacent planes corresponding to the adjacent planes in which the ends of the ring and the corresponding ears are moved when the ears are squeezed together.

A further object is to make this tool so that in closed position of the tool handles, the jaws are in overlapped position to provide for maximum opening of the clamp ring.

Other and more specific objects will become apparent in the following detailed description of one form of the invention, as illustrated in the accompanying drawings, wherein:

FIG. 1 is a side view of a plier type tool made in accordance with the present invention, showing how it is applied to a spring wire clamp, FIG. 2 is a sectional view taken on the line 2—2 of FIG. 1, FIG. 3 is an enlarged detail view of one of the jaws taken on the line 3—3 of FIG. 2, and FIG. 4 is a sectional view of the jaw taken on the line 4—4 of Fig. 3.

The present tool comprises a pair of flat jaws 10 hingedly mounted at 12 in side by side slidable relation, so that their adjacent faces 14 and 16 will overlap when their handles 18 and 20 are brought together. The flat bearing surfaces at the hinge are in the plane of these adjacent faces, and are made large to prevent excessive cocking or play between the jaws and to provide a firm grip on the ears 22 of the spring wire clamp ring 24 during the squeezing operation to expand the ring.

Grooves 26 are provided in the front faces of the jaws 10 at their outer ends to accommodate the ears 22 of the clamp ring 24, the bottom of each groove being rounded outwardly at the tip of the jaw so as to catch over the elbow 28 of the sharp bend in the wire of the clamp ring forming the ear 22, as the jaws are rotated toward each other in their adjacent planes corresponding to the adjacent clamp ring wire ends 30.

The grooves 26 are placed close to the faces 14 and 16, or may even extend through these faces, so that the faces 14 and 16 at the tips of the jaws will slide along the corresponding sides of the ring ends 30, and will guide the ring against twisting, as the ears 22 are squeezed together to the point of passing each other and as the ring is opened even wider and the ears are spread away from each other by the full closure of the handles 18 and 20 of the tool.

The handles 18 and 20 may be bent out of the plane of the jaws 10 just back of the hinge bearing 12, so as to facilitate the use of the tool on a hose connection to a short pipe extending from an extensive wall surface or elsewhere where the space would not permit operation of the handles in line with the jaws.

The relative angles between the jaws and their respective handles may be so designed as to permit the normal operation of the jaws between an open position with the grooves spread apart sufficiently to admit the ears of a clamp ring into them, and a closed position with the grooves moved slightly past each other and the ring opened to its fully expanded size for slipping easily over the largest hose for which it is designed.

Many other obvious modifications in the detail structure and form of the parts may be made without departing from the spirit and scope of the invention as defined in the appended claims.

What is claimed is:

1. A plier-type tool for handling spring-wire clamp rings having overlapping ends with terminal ears bent radially outwardly and shaped for squeezing together to expand the clamp ring and for releasing to permit the ring to resiliently clamp itself around a hose connection of corresponding size comprising a pair of jaws with flat-bearing hinge surfaces hinged in a side by side relation with their adjacent faces slidably relative to each other in a plane normal to the axis of the hinge, the front face of each jaw extending to one side of said plane so that said faces pass each other when the tool is fully closed, a groove in the front face of each jaw near its slidable face and a pair of divergent plier-type handles for operating said jaws from an open-position for separating the grooves in the jaws sufficiently to insert the ears of the clamp ring therein to a closed-position for fully expanding the ring within its limits of expansion.

2. The plier-type tool of claim 1 further characterized in that said handles are extended to operate substantially in the plane of the slidable faces of said jaws.

3. The plier-type tool of claim 1 further characterized in that said handles are extended at an angle to one end of the hinge's axis to operate in a plane angularly offset from the plane of the slidable faces of the jaw.

4. The plier-type tool of claim 1 further characterized in that said jaws have a large bearing for their hinge and a flat bearing hinged surface in the same plane as their adjacent faces.

5. A plier-type tool for handling spring-wire clamp rings having overlapping ends with terminal ears bent radially outwardly and shaped for squeezing together to expand the clamp ring and for releasing to permit the ring to resiliently clamp itself around a hose connection of corresponding size comprising a pair of jaws with flat-bearing hinge surfaces hinged in a side by side relation with their adjacent faces slidably relative to each other in a plane normal to the axis of the hinge, the front face of each jaw extending to one side of said plane so that said faces pass each other when the tool is fully closed, a groove in the front face of each jaw near its slidable face; said grooves having their bottoms rounded outwardly at the outer edges for holding the bends of the ring at the base of the ears to keep same from slipping from the jaws as they close to expand the ring; and a pair of divergent plier-type handles for operating said jaws from an open-position for separating the grooves in the jaws sufficiently to insert the ears of the clamp ring therein to a closed position for fully expanding said ring within its limits of expansion.

6. The plier-type tool of claim 5 further characterized in that the outer ends of said jaws are sufficiently long to slidably engage the side of the adjacent ends of the ring so as to steady said ring during operation of the tool and to hold the ring from twisting as the tool approaches its closed position to a fully expanded ring.

References Cited by the Examiner

UNITED STATES PATENTS

| | | | |
|---|---|---|---|
| 397,389 | 2/89 | Richards | 81—416 X |
| 2,042,312 | 5/36 | Huebner | 254—50.1 |
| 2,166,089 | 7/39 | Brenner | 29—229 X |
| 2,602,357 | 7/52 | Nash | 81—5.1 |
| 2,677,982 | 5/54 | Arras et al. | 81—9.3 |
| 2,898,789 | 8/59 | Meese | 81—9.3 |

FOREIGN PATENTS 916,411    1/63    Great Britain.

WILLIAM FELDMAN, *Primary Examiner.*

MILTON S. MEHR, *Examiner.*